US009460714B2

(12) United States Patent
Ding et al.

(10) Patent No.: US 9,460,714 B2
(45) Date of Patent: Oct. 4, 2016

(54) SPEECH PROCESSING APPARATUS AND METHOD

(71) Applicant: Kabushiki Kaisha Toshiba, Minato-ku (JP)

(72) Inventors: Ning Ding, Yokohama (JP); Yusuke Kida, Kawasaki (JP); Makoto Hirohata, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 34 days.

(21) Appl. No.: 14/485,202

(22) Filed: Sep. 12, 2014

(65) Prior Publication Data
US 2015/0081298 A1   Mar. 19, 2015

(30) Foreign Application Priority Data

Sep. 17, 2013  (JP) .................................. 2013-192399

(51) Int. Cl.
| G10L 15/06 | (2013.01) |
| G10L 15/20 | (2006.01) |
| G10L 21/0216 | (2013.01) |

(52) U.S. Cl.
CPC ...... *G10L 15/20* (2013.01); *G10L 2021/02166* (2013.01)

(58) Field of Classification Search
CPC ..... G10L 15/00; G10L 15/005; G10L 15/04; G10L 15/05; G10L 15/08; G10L 15/24; G10L 15/25; G10L 17/00; G10L 17/02; G10L 17/06; G10L 17/08
USPC ........ 704/245, 236, 239, 243, 248, 249, 250
See application file for complete search history.

(56) References Cited

U.S. PATENT DOCUMENTS

2003/0120485 A1* 6/2003 Murase ............... G10L 21/0208
704/228
2006/0020473 A1* 1/2006 Hiroe .................... G10L 13/027
704/275
(Continued)

FOREIGN PATENT DOCUMENTS

| JP | 2004-318026 A | 11/2004 |
| JP | 2007-318438 A | 12/2007 |

(Continued)

OTHER PUBLICATIONS

Ralph O. Schmidt, "Muliple Emitter Location and Signal Parameter Estimation", IEEE Transactions on Antennas and Propagation, vol. 34, No. 3, Mar. 1986, pp. 276-280.

*Primary Examiner* — Qi Han
(74) *Attorney, Agent, or Firm* — Oblon, McClelland, Maier & Neustadt, L.L.P.

(57) ABSTRACT

In a speech processing apparatus, an acquisition unit is configured to acquire a speech. A separation unit is configured to separate the speech into a plurality of sections in accordance with a prescribed rule. A calculation unit is configured to calculate a degree of similarity in each combination of the sections. An estimation unit is configured to estimate, with respect to the each section, a direction of arrival of the speech. A correction unit is configured to group the sections whose directions of arrival are mutually similar into a same group and correct the degree of similarity with respect to the combination of the sections in the same group. A clustering unit is configured to cluster the sections by using the corrected degree of similarity.

6 Claims, 22 Drawing Sheets

(56) References Cited

U.S. PATENT DOCUMENTS

| | | | |
|---|---|---|---|
| 2007/0050190 A1* | 3/2007 | Washio | G10L 15/22 704/249 |
| 2009/0198495 A1 | 8/2009 | Hata | |
| 2009/0220065 A1* | 9/2009 | Ahuja | H04M 3/569 379/202.01 |
| 2014/0278417 A1* | 9/2014 | Chen | G10L 17/06 704/246 |

FOREIGN PATENT DOCUMENTS

| | | |
|---|---|---|
| JP | 2009-271183 A | 11/2009 |
| JP | 2010-054733 A | 3/2010 |

\* cited by examiner

| Time | Speaker | Section |
|---|---|---|
| 0~3s | A | 1 |
| 3~6s | B | 2 |
| 6~9s | A | 3 |
| 9~12s | B | 4 |
| 12~15s | A | 5 |
| 15~18s | B | 6 |

FIG.5

|  | Section 1 | Section 2 | Section 3 | Section 4 | Section 5 | Section 6 |
|---|---|---|---|---|---|---|
| Section 1 |  | 0.53 | 0.87 | 0.48 | 0.91 | 0.45 |
| Section 2 |  |  | 0.52 | 0.74 | 0.39 | 0.70 |
| Section 3 |  |  |  | 0.76 | 0.85 | 0.55 |
| Section 4 |  |  |  |  | 0.50 | 0.83 |
| Section 5 |  |  |  |  |  | 0.24 |
| Section 6 |  |  |  |  |  |  |

FIG.6

| Section | Direction of arrival of speech |
|---|---|
| Section 1 | -42 degree |
| Section 2 | 28 degree |
| Section 3 | -40 degree |
| Section 4 | 30 degree |
| Section 5 | -39 degree |
| Section 6 | 31 degree |

FIG.7

|  | Section 1 | Section 3 | Section 5 |
|---|---|---|---|
| Section 1 |  | 0.87 | 0.91 |
| Section 3 |  |  | 0.85 |
| Section 5 |  |  |  |
FIG. 8A
|  | Section 1 | Section 3 | Section 5 |
|---|---|---|---|
| Section 1 |  | 1.09 | 1.14 |
| Section 3 |  |  | 1.06 |
| Section 5 |  |  |  |
FIG. 8B
Correct degrees of similarity
|  | Section 2 | Section 4 | Section 6 |
|---|---|---|---|
| Section 2 |  | 0.74 | 0.70 |
| Section 4 |  |  | 0.83 |
| Section 6 |  |  |  |
FIG. 8C
|  | Section 2 | Section 4 | Section 6 |
|---|---|---|---|
| Section 2 |  | 0.93 | 0.88 |
| Section 4 |  |  | 1.04 |
| Section 6 |  |  |  |
FIG. 8D
Correct degrees of similarity

|  | Section 1 | Section 2 | Section 3 | Section 4 | Section 5 | Section 6 |
|---|---|---|---|---|---|---|
| Section 1 |  | 0.53 | 1.09 | 0.48 | 1.14 | 0.45 |
| Section 2 |  |  | 0.52 | 0.93 | 0.39 | 0.88 |
| Section 3 |  |  |  | 0.76 | 1.06 | 0.55 |
| Section 4 |  |  |  |  | 0.50 | 1.04 |
| Section 5 |  |  |  |  |  | 0.24 |
| Section 6 |  |  |  |  |  |  |

FIG.9

|          | Section 1 | Section 2 | Section 3 | Section 4 | Section 5 | Section 6 |
|----------|-----------|-----------|-----------|-----------|-----------|-----------|
| Section 1 |          | 0.45      | 0.79      | 0.48      | 0.81      | 0.39      |
| Section 2 |          |           | 0.52      | 0.90      | 0.33      | 0.70      |
| Section 3 |          |           |           | 0.56      | 0.86      | 0.50      |
| Section 4 |          |           |           |           | 0.49      | 0.91      |
| Section 5 |          |           |           |           |           | 0.53      |
| Section 6 |          |           |           |           |           |           |

FIG.11

| Section | Direction of arrival of speech |
|---|---|
| Section 1 | -42 degree |
| Section 2 | -39 degree |
| Section 3 | -40 degree |
| Section 4 | -39 degree |
| Section 5 | -37 degree |
| Section 6 | -39 degree |

FIG.12

|  | Section 1 | Section 2 | Section 3 | Section 4 | Section 5 | Section 6 |
|---|---|---|---|---|---|---|
| Section 1 |  | 0.45 | 0.99 | 0.48 | 1.01 | 0.39 |
| Section 2 |  |  | 0.52 | 1.13 | 0.33 | 0.88 |
| Section 3 |  |  |  | 0.56 | 1.08 | 0.50 |
| Section 4 |  |  |  |  | 0.49 | 1.14 |
| Section 5 |  |  |  |  |  | 0.53 |
| Section 6 |  |  |  |  |  |  |

FIG.13

| Section | Direction of arrival of speech |
|---|---|
| Section 1 | -42 degree |
| Section 2 | 28 degree |
| Section 3 | -40 degree |
| Section 4 | 30 degree |
| Section 5 | -39 degree |
| Section 6 | -38 degree |

FIG.14

|  | Section 1 | Section 3 | Section 5 | Section 6 |
|---|---|---|---|---|
| Section 1 |  | 0.87 | 0.91 | 0.45 |
| Section 3 |  |  | 0.85 | 0.55 |
| Section 5 |  |  |  | 0.24 |
| Section 6 |  |  |  |  |
FIG. 15A
Correct degrees of similarity
|  | Section 1 | Section 3 | Section 5 | Section 6 |
|---|---|---|---|---|
| Section 1 |  | 1.09 | 1.14 | 0.45 |
| Section 3 |  |  | 1.06 | 0.55 |
| Section 5 |  |  |  | 0.24 |
| Section 6 |  |  |  |  |
FIG. 15B
|  | Section 2 | Section 4 |
|---|---|---|
| Section 2 |  | 0.74 |
| Section 4 |  |  |
FIG. 15C
Correct degrees of similarity
|  | Section 2 | Section 4 |
|---|---|---|
| Section 2 |  | 0.93 |
| Section 4 |  |  |
FIG. 15D

|  | Section 1 | Section 2 | Section 3 | Section 4 | Section 5 | Section 6 |
|---|---|---|---|---|---|---|
| Section 1 |  | 0.53 | 1.09 | 0.48 | 1.14 | 0.45 |
| Section 2 |  |  | 0.52 | 0.93 | 0.39 | 0.70 |
| Section 3 |  |  |  | 0.76 | 1.06 | 0.55 |
| Section 4 |  |  |  |  | 0.50 | 0.83 |
| Section 5 |  |  |  |  |  | 0.24 |
| Section 6 |  |  |  |  |  |  |

FIG.16

| Time | Speaker | Section |
|------|---------|---------|
| 0~3s | A | 1 |
| 3~6s | A | 2 |
| 6~9s | A | 3 |

FIG.18

|  | Section 1 | Section 2 | Section 3 |
|---|---|---|---|
| Section 1 |  | 0.87 | 0.91 |
| Section 2 |  |  | 0.85 |
| Section 3 |  |  |  |

FIG.19

| Section | Direction of arrival of speech |
|---------|-------------------------------|
| Section 1 | -42 degree |
| Section 2 | -40 degree |
| Section 3 | 0 degree |

FIG.20

|  | Section 1 | Section 2 |
|---|---|---|
| Section 1 |  | 0.87 |
| Section 2 |  |  |

Correct degrees of similarity

|  | Section 1 | Section 2 |
|---|---|---|
| Section 1 |  | 1.09 |
| Section 2 |  |  |

|           | Section 1 | Section 2 | Section 3 |
|-----------|-----------|-----------|-----------|
| Section 1 |           | 1.09      | 0.91      |
| Section 2 |           |           | 0.85      |
| Section 3 |           |           |           |

FIG.22

SPEECH PROCESSING APPARATUS AND METHOD

CROSS-REFERENCE TO RELATED APPLICATION

This application is based upon and claims the benefit of priority from Japanese Patent Application No. 2013-192399, filed on Sep. 17, 2013; the entire contents of which are incorporated herein by reference.

FIELD

Embodiments described herein relate generally to a speech processing apparatus and method.

BACKGROUND

Speaker clustering is a method which recognizes speeches of a plurality of human speakers. Speaker clustering is often implemented in an apparatus which supports drawing up minutes of a conference.

Some speaker clustering methods try to recognize the speeches of the plurality of speakers accurately based on directions of the speakers and acoustic features of acquired speeches. The directions of the speakers are estimated by using a microphone array including a plurality of microphones.

One speaker clustering method using a microphone array operates to separate a speech to a plurality of clusters based on a direction of arrival estimation within a limit period from a previous time, to build speech models from the speeches in the same cluster, and to recognize a presently acquired speech by using built speech models.

However, such a speaker clustering method cannot accurately recognize speakers due to an accuracy of estimation of a direction of arrival of a speech and a position of a speaker, etc.

BRIEF DESCRIPTION OF THE DRAWINGS

FIG. 5 is an exemplary diagram representing sections of speech data and speakers according to the concrete example 1.

FIG. 6 is an exemplary diagram representing degrees of similarity of acoustic features of each combination of the sections according to the concrete example 1.

FIG. 7 is an exemplary diagram representing directions of arrivals of speeches of each section according to the concrete example 1.

FIGS. 8(A)-8(D) are exemplary diagrams representing corrected degrees of similarity of the acoustic features of the each section according to the concrete example 1.

FIG. 9 is an exemplary diagram representing corrected degrees of similarity of the acoustic features of the each section according to the concrete example 1.

FIG. 11 is an exemplary diagram representing degrees of similarity of acoustic features of each combination of sections according to the concrete example 2.

FIG. 12 is an exemplary diagram representing directions of arrivals of speeches of each section according to the concrete example 2.

FIG. 13 is an exemplary diagram representing corrected degrees of similarity of the acoustic features of the each section according to the concrete example 2.

FIG. 14 is an exemplary diagram representing directions of arrivals of speeches of each section according to a concrete example 3 in the first embodiment.

FIGS. 15(A)-15(D) are exemplary diagrams representing corrected degrees of similarity of acoustic features of each section according to the concrete example 3.

FIG. 16 is an exemplary diagram representing corrected degrees of similarity of the acoustic features of the each section according to the concrete example 3.

FIG. 18 is an exemplary diagram representing sections of speech data and speakers according to the concrete example 4.

FIG. 19 is an exemplary diagram representing degrees of similarity of acoustic features of each combination of sections according to the concrete example 4.

FIG. 20 is an exemplary diagram representing directions of arrivals of speeches of each section according to the concrete example 4.

FIG. 22 is an exemplary diagram representing corrected degrees of similarity of the acoustic features of the each section according to the concrete example 4.

DETAILED DESCRIPTION

According to one embodiment, a speech processing apparatus includes an acquisition unit, a separation unit, a calculation unit, an estimation unit, a correction unit, and a clustering unit. The acquisition unit is configured to acquire a speech. The separation unit is configured to separate the speech into a plurality of sections in accordance with a prescribed rule. The calculation unit is configured to calculate a degree of similarity in each combination of the sections. The estimation unit is configured to estimate, with respect to the each section, a direction of arrival of the speech. The correction unit is configured to group the sections whose directions of arrival are mutually similar into the same group and correct a degree of similarity with respect to the combination of the sections in the same group. The clustering unit is configured to cluster the sections by using the corrected degree of similarity.

An embodiment will be described hereinafter with reference to the accompanying drawings.

The First Embodiment

A speech processing apparatus 1 according to a first embodiment is suitable for a conference supporting apparatus which supports drawing up minutes of a conference. The conference supporting apparatus may be realized by an exclusive machine provided in a conference room, a personal computer (PC), a tablet PC, and a smartphone, including microprocessor based units, etc.

The speech processing apparatus 1 performs speaker clustering which recognize speeches of a plurality of speakers in a condition that the plurality of speakers speak. The speaker clustering adds information such as a speaker's ID and utterance time of speakers to speech data. The speaker clustering can be used for operations such as searching for a recorded speech and cueing.

The speech processing apparatus 1 obtains degrees of similarity of acoustic features of each acquired speech. The speech processing apparatus 1 estimates directions of arrival of each speech. The speech processing apparatus 1 corrects the degree of similarity to a higher degree with respect to a combination of the speeches whose directions of arrival are mutually similar. The speech processing apparatus 1 performs the speaker clustering with respect to each speech by using the corrected degree of similarity. Hence, the speech processing apparatus 1 can perform the speaker clustering without declining accuracy. The acoustic features can be represented by feature vectors.

Figure 1:
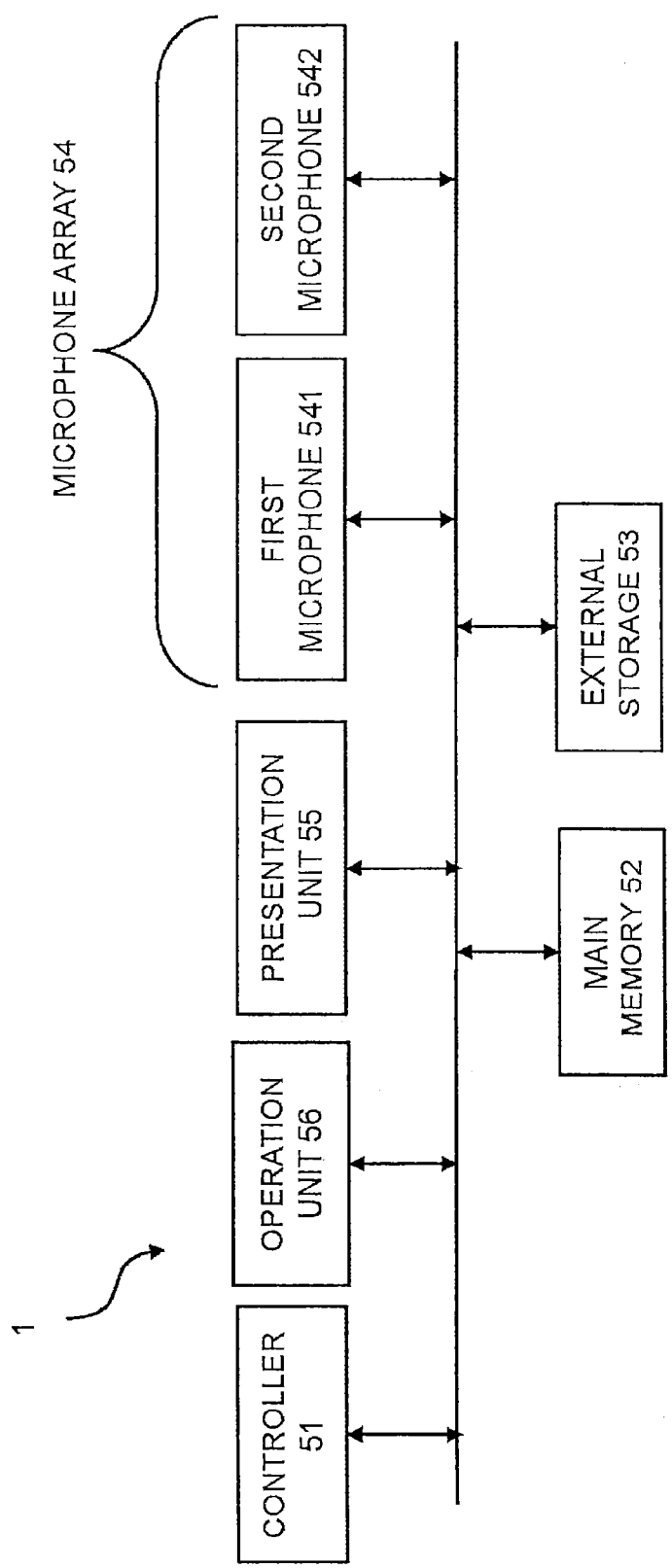
FIG. 1 is an exemplary diagram representing a hardware configuration of a speech processing apparatus 1 according to a first embodiment.

FIG. 1 is an exemplary diagram representing a hardware configuration of a speech processing apparatus 1. The speech processing apparatus 1 includes a controller 51, a main memory 52, an external storage 53, and a bus. The controller 51 includes a CPU (Central Processing Unit) controlling the whole apparatus. The main memory 52 includes a ROM (Read Only Memory) and RAM (Random Access Memory) storing computer data and computer programs. The external storage 53 includes a memory such as a HDD (Hard Disk Drive) and/or CD (Compact Disk) driver storing computer data and computer programs. The bus connects the controller 51, the main memory 52, and the external storage 53. The speech processing apparatus 1 can be implemented in hardware by using a general purpose computer.

The controller 51 has a function of clocking. The speech processing apparatus 1 is connected to a microphone array 54, a presentation unit 55, and an operation unit 56 wirelessly or hardwired. The presentation unit 55 can be implemented by a CPU or processor. The microphone array 54 receives inputs of speeches. The presentation unit 55 outputs sounds and images. The operation unit 56 receives inputs of instructions of a user. The operation unit 56 is for example a keyboard, a mouse, and/or a touch panel. The microphone array 54 includes at least a first microphone 541 and a second microphone 542. The microphone array 54 may include three microphones or more.

Figure 2:
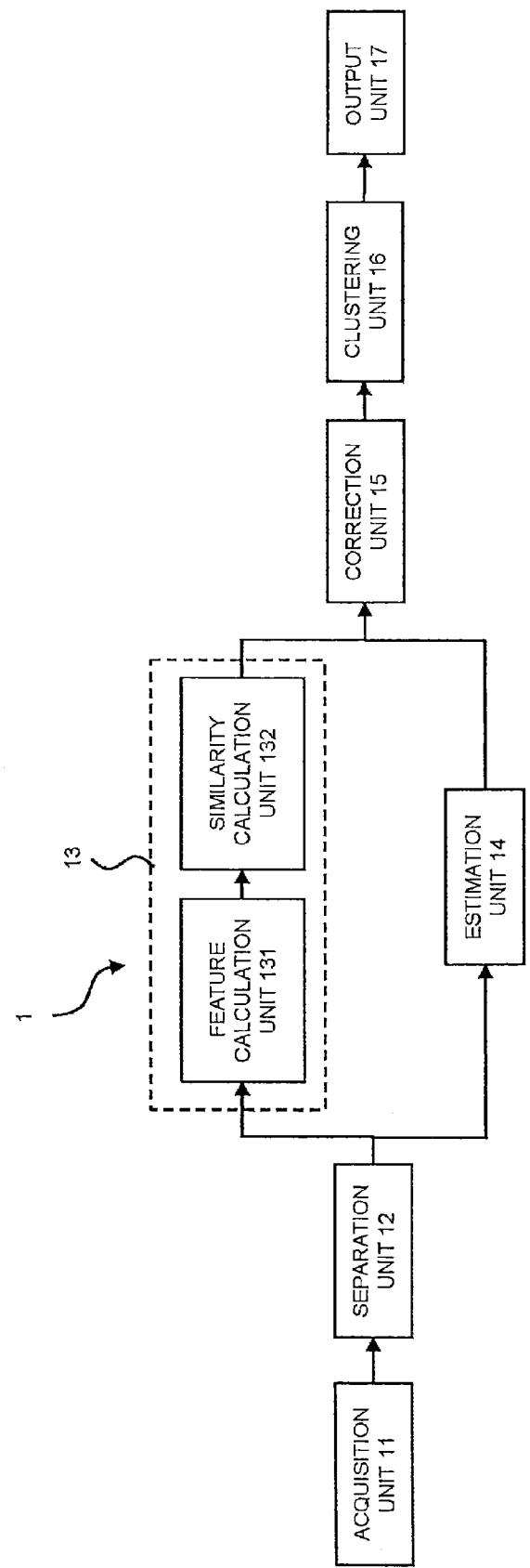
FIG. 2 is a block diagram of the speech processing apparatus 1.

FIG. 2 is a block diagram of the speech processing apparatus 1. The speech processing apparatus 1 includes an acquisition unit 11, a separation unit 12, a calculation unit 13, an estimation unit 14, a correction unit 15, a clustering unit 16, and an output unit 17. The calculation unit 13 includes a feature calculation unit 131 and a similarity calculation unit 132.

The acquisition unit 11, the separation unit 12, the calculation unit 13, the estimation unit 14, the correction unit 15, the clustering unit 16, and the output unit 17 may be realized by the controller 51, the main memory 52, and the external storage 53.

The acquisition unit 11 acquires speech data of a speaker's utterance etc. In this embodiment, the acquisition unit 11 acquires the speech data inputted from the microphone array 54 (the first microphone 541 and the second microphone 542).

With respect to each of speech data inputted from the first microphone 541 and the second microphone 542, the separation unit 12 separates the speech data into a plurality of sections in accordance with a prescribed rule. For example, the separation unit 12 may separate the speech data at every specific interval (for example, every one second) into a plurality of sections. Or the separation unit 12 may estimate whether the speech data is a human's voice or not, and extract portions estimating the human's voice as the plurality of sections.

The calculation 13 unit calculates a degree of similarity in each combination of the sections. The calculation 13 unit may calculate the degree of similarity with respect to the speech data inputted from the first microphone 541 or the second microphone 542.

In this embodiment, the calculation 13 unit calculates the degree of similarity by obtaining acoustic features of each section. The feature calculation unit 131 calculates the acoustic features of each separated section. For example, the acoustic features may be MFCC (Mel-Frequency Cepstrum Coefficient) and LPC (Liner Predictive Coding) cepstrum, etc. The similarity calculation unit 132 calculates the degree of similarity in each combination of the sections by using the calculated acoustic features. The degree of similarity may be a correlation coefficient. The estimation unit 14 estimates, with respect to the each section, a direction of arrival of the speech. For example, the estimation unit 14 may compare speech data inputted from the first microphone 541 and the second microphone 542, calculate a time delay of the corresponding sections, and estimate the direction of arrival of the speech.

The correction unit 15 groups the sections whose directions of arrival are mutually similar into the same group and corrects the degree of similarity with respect to the combination of the sections in the same group. In this embodiment, the correction unit 15 can define reference directions such as 0-degree, 10-degree, 20-degree, etc. The correction unit 15 estimates sections whose directions of arrival are included within a definite range from the reference direction as the sections whose directions of arrival are mutually similar, and groups them into the same group. The reference directions may be set at a manufacturing stage or at a use stage.

The correction unit 15 corrects the degree of similarity calculated by the similarity calculation unit 132 to be higher when the calculated degree of similarity of sections in the same group is higher than a prescribed threshold. For example, the correction unit 15 may correct the calculated degree of similarity to be higher by multiplying the calculated degree of similarity by N(N is a real number whose value is more than 1), or by raising the calculated degree of similarity to the M-th power (M is a real number whose value is more than 1). The correction unit 15 may have a conversion table used for correcting the degree of similarity, and correct the degree of similarity by using the conversion table. The correction unit 15 may also correct the degree of similarity by a computation process.

The clustering unit 16 performs the speaker clustering with respect to each section by using the corrected degree of similarity, and recognizes the speaker of each section. In this embodiment, the clustering unit 16 adds a speaker's ID and an utterance time to each section of acquired speech data.

The output unit 17 outputs the speech data after having performed the speaker clustering to an outside unit such as the external storage 53 and the presentation unit 55.

As mentioned above, the composition of the speech processing apparatus 1 is explained.

Figure 3:
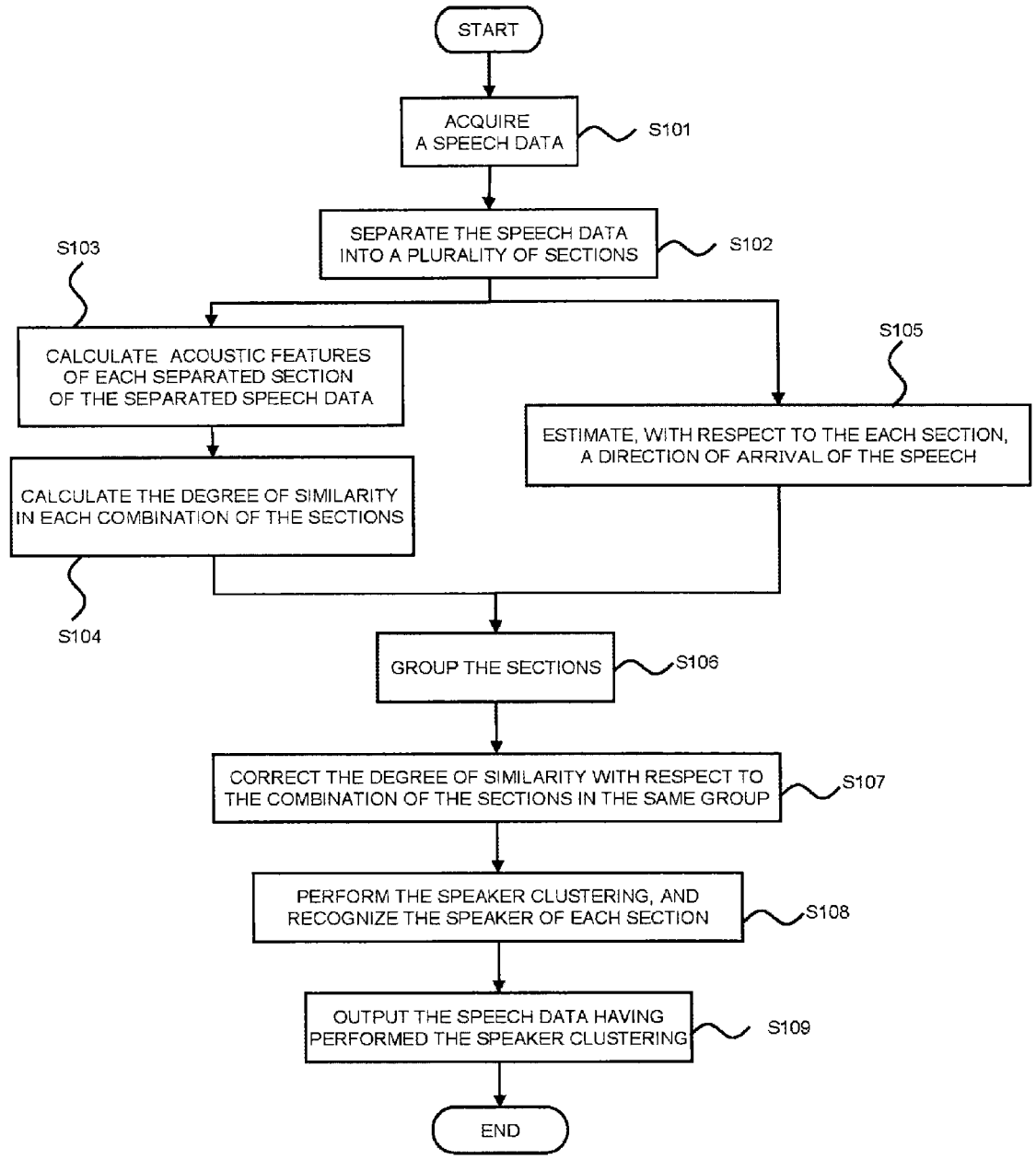
FIG. 3 is a flowchart of processing executed in the speech processing apparatus 1.

FIG. 3 is a flow chart of processing executed by the speech processing apparatus 1. The acquisition unit 11 acquires a speech data (S101). The acquisition unit 11 supplies the acquired speech data to the separation unit 12 and the clustering unit 16.

The separation unit 12 separates the speech data into a plurality of sections in accordance with a prescribed rule (S102). The separation unit 12 supplies the speech data separated into the plurality of the sections to the feature calculation unit 131 and the estimation unit 14.

The feature calculation unit 131 calculates the acoustic features of each separated section of the separated speech data (S103). The feature calculation unit 131 supplies the acoustic features of each separated section to the similarity calculation unit 132.

The similarity calculation unit 132 calculates the degree of similarity in each combination of the sections by using the calculated acoustic features (S104). The similarity calculation unit 132 supplies the calculated degree of similarity to the correction unit 15

The estimation unit 14 estimates, with respect to the each section, a direction of arrival of the speech (S105). The estimation unit 14 supplies the information of the estimated direction of arrival to the correction unit 15.

The correction unit 15 groups the sections whose directions of arrival are mutually similar into the same group (S106). The correction unit 15 corrects the degree of similarity with respect to the combination of the sections in the same group (S107). The correction unit 15 supplies the corrected degree of similarity to the clustering unit 16.

The clustering unit 16 performs the speaker clustering with respect to the each section by using the corrected degree of similarity, and recognizes the speaker of each section (S108). The clustering unit 16 supplies the speech data after having performed the speaker clustering to the output unit 17.

The output unit 17 outputs the speech data after having performed the speaker clustering to an outside unit such as the external storage 53 and the presentation unit 55 (S109).

As mentioned above, the processing of the speech processing apparatus 1 is explained.

Concrete examples are explained below.

Concrete Example 1

Figure 4:
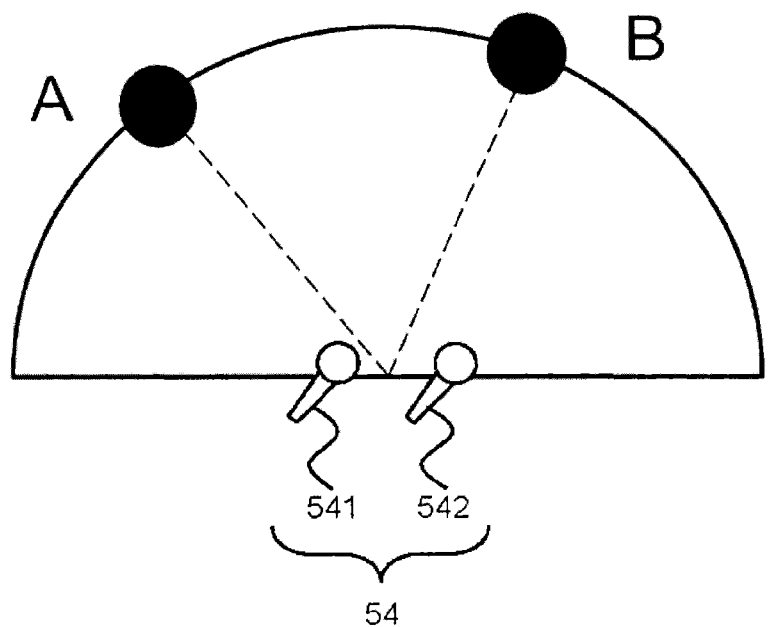
FIG. 4 is an exemplary diagram representing positions of a microphone array 54 and speakers according to a concrete example 1 in the first embodiment.

FIG. 4 is an exemplary diagram representing positions of a microphone array 54 and speakers according to a concrete example 1 in the first embodiment. In this example, it is assumed that a speaker A and a speaker B exist at different directions from the microphone array 54.

FIG. 5 is an exemplary diagram representing sections of speech data and speakers according to this example. In this example, it is assumed that a section 1, a section 3, and a section 5 are sections uttered by the speaker A, and a section 2, a section 4, and a section 6 are sections uttered by the speaker B. The section 1 is the section from 0 second to 3 second in the speech data. The section 2 is the section from 3 second to 6 second in the speech data. The section 3 is the section from 6 second to 9 second in the speech data. The section 4 is the section from 9 second to 12 second in the speech data. The section 5 is the section from 12 second to 15 second in the speech data. The section 6 is the section from 15 second to 18 second in the speech data.

FIG. 6 is an exemplary diagram representing a degree of similarity of acoustic features of each combination of the sections according to this example. In this example, a recognition threshold is 0.80. The recognition threshold is a threshold which is used for estimation of whether two sections of speech are the same speaker's utterance.

In FIG. 6, the degree of similarity of the combination of the section 1 and the section 3 and the degree of similarity of the combination of the section 1 and the section 5 are higher than 0.80. Therefore, the section 1, the section 3, and the section 5 are recognized as utterances of the same speaker (the speaker A) by the clustering unit 16.

The degree of similarity of the combination of the section 4 and the section 6 is higher than 0.80. However, the degree of similarity of the combination of the section 2 and the section 4 is 0.72 (lower than 0.80) and the degree of similarity of the combination of the section 2 and the section 6 is 0.70 (lower than 0.80). Therefore, the section 4 and the section 6 are recognized as utterances of the same speaker (the speaker B) by the clustering unit 16. However, it is erroneously estimated that the speaker of the section 2 is different from the speaker of the section 4 and the section 6.

The correction unit 15 can correct a degree of similarity to correct that error. The correction unit 15 groups the sections whose directions of arrival are mutually similar into the same group and corrects the degree of similarity to be higher with respect to the combination of the sections in the same group.

FIG. 7 is an exemplary diagram representing determined directions of arrivals of the speeches of the each section according to this example. As shown in FIG. 7, the directions of arrivals of the section 1, the section 3, and the section 5 are mutually similar.

The correction unit 15 groups the sections whose directions of arrival are mutually similar into the same group and corrects the degree of similarity with respect to the combination of the sections in the same group. In this example, the correction unit 15 multiplies, with respect to the combination of the sections whose degree of similarity is higher than 0.60, the degree of similarity by 1.25

The threshold of the degree of similarity to be corrected by the correction unit 15 is preferably lower than the recognition threshold.

FIGS. 8(A)-8(D) are exemplary diagrams representing corrected degrees of similarity of the acoustic features of the each section according to this example. FIG. 8(A) represents the degrees of similarity before correction with respect to each combination of the section 1, the section 3, and the section 5. FIG. 8(B) represents the degrees of similarity after correction with respect to each combination of the section 1, the section 3, and the section 5. FIG. 8(C) represents the degrees of similarity before correction with respect to each combination of the section 2, the section 4, and the section 6. FIG. 8(D) represents the degrees of similarity after correction with respect to each combination of the section 2, the section 4, and the section 6.

Due to the correction by the correction unit 15, the degrees of similarity of each combination of the section 1, the section 3, and the section 5 in the same group are corrected from the state in FIG. 8(A) to the state in FIG. 8(B). The degrees of similarity of each combination of the section 2, the section 4, and the section 6 in the same group are corrected from the state in FIG. 8(C) to the state in FIG. 8(D).

FIG. 9 is an exemplary diagram representing corrected degrees of similarity of the acoustic features of the each section according to this example. That is, FIG. 9 shows corrected degrees of similarity from the originally detected values of FIG. 5. As shown in FIG. 9, in this example, due to the correction by the correction unit 15, the degree of the similarity of the combination of the section 2 and the section 4 is corrected from 0.72 (in FIG. 5) to 0.93 (higher than 0.80). The degree of the similarity of the combination of the section 2 and the section 6 is corrected from 0.70 (in FIG. 5) to 0.88 (higher than 0.80).

Thus, the clustering unit 16 recognizes the speaker of the section 1, the section 3, and the section 5 as the same speaker (the speaker A). The clustering unit 16 recognizes the speaker of the section 2, the section 4, and the section 6 as the same speaker (the speaker B). Hence, the same result as the actual facts shown in FIG. 5 is obtained.

As mentioned above, the concrete example 1 is explained.

Concrete Example 2

Figure 10:
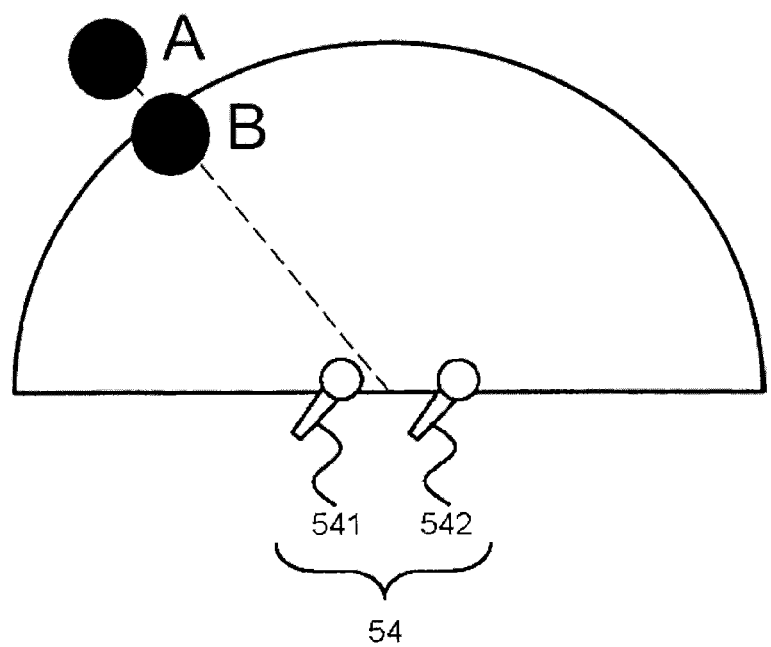
FIG. 10 is an exemplary diagram representing positions of a microphone array 54 and speakers according to a concrete example 2 in the first embodiment.

FIG. 10 is an exemplary diagram representing positions of a microphone array 54 and speakers according to a concrete example 2.

In this example, it is assumed that a section 1, a section 3, and a section 5 are sections uttered by the speaker A, and a section 2, a section 4, and a section 6 are sections uttered by the speaker B same as in the concrete example 1.

FIG. 11 is an exemplary diagram representing the sections of the speech data separated by the separation unit 12 and degrees of similarity of acoustic features of each combination of the sections calculated by the calculation unit 13 in this example. The recognition threshold is also 0.80 in this example.

FIG. 12 is an exemplary diagram representing direction of arrivals of the speeches of the each section according to this example. As shown in FIG. 12, in this example, all of the section 1, the section 2, the section 3, the section 4, the section 5, and the section 6 are grouped into the same group. In this example, the correction unit 15 multiplies, with respect to the combination of the sections whose degree of similarity is higher than 0.60, the degree of similarity by 1.25 same as in the concrete example 1.

FIG. 13 is an exemplary diagram representing corrected degrees of similarity of the acoustic features of the each section by the correction unit 15 according to this example 2. As shown in FIG. 13, the degree of similarity of the combination of each section whose value is higher than 0.60 is multiplied by 1.25. The degree of similarity of the combination of each section whose value is lower than 0.60 is not multiplied by 1.25.

Thus, the clustering unit 16 recognizes the speaker of the section 1, the section 3, and the section 5 as the same speaker (the speaker A). The clustering unit 16 recognizes the speaker of the section 2, the section 4, and the section 6 as the same speaker (the speaker B). Hence, the same result as the actual facts shown in FIG. 5 is obtained.

As mentioned above, the concrete example 2 is explained.

Concrete Example 3

In the concrete example 3, it is assumed that a speaker A and a speaker B exist at different directions from the microphone array 54 same as in the concrete example 1. In this example, it is assumed that a section 1, a section 3, and a section 5 are sections uttered by the speaker A, and a section 2, a section 4, and a section 6 are sections uttered by the speaker B same as in the concrete example 1 as shown in FIG. 5. The degrees of the similarity of each section in this example are the same as the concrete example 1 as shown in FIG. 6. The recognition threshold is also 0.80 in this example. In this example, the correction unit 15 multiplies, with respect to the combination of the sections whose degree of similarity is higher than 0.60, the degree of similarity by 1.25 same as in the concrete example 1.

FIG. 14 is an exemplary diagram representing degrees of similarity of acoustic features of each combination of the sections in this example. As shown in FIG. 14, the section 1, the section 3, the section 5, and the section 6 are grouped into the same group, and the section 2 and the section 4 are grouped into the same group. However, in this example, it is assumed that the estimation unit 14 incorrectly estimates the direction of arrival of the utterance of the section 6, and the correction unit 15 consequently groups the section 1, the section 3, the section 5, and the section 6 into the same group.

FIGS. 15(A)-15(D) are exemplary diagrams representing corrected degrees of similarity of the acoustic features of the each section in this example 3. FIG. 15(A) represents the degrees of similarity before correction with respect to each combination of the section 1, the section 3, the section 5, and the section 6. FIG. 15(B) represents the degrees of similarity after correction with respect to each combination of the section 1, the section 3, the section 5, and the section 6. FIG. 15(C) represents the degrees of similarity before correction with respect to the combination of the section 2 and the section 4. FIG. 15(D) represents the degrees of similarity after correction with respect to the combination of the section 2 and the section 4.

Due to the correction by the correction unit 15, the degrees of similarity of each combination of the section 1, the section 3, the section 5, and the section 6 in the same group are corrected from the state in FIG. 15(A) to the state in FIG. 15(B). The degrees of similarity of the combination of the section 2 and the section 4 in the same group are corrected from the state in FIG. 15(C) to the state in FIG. 15(D).

As shown in FIGS. 15(A)-15(D), the degree of similarity between the section 1 and the section 6 (0.45), the degree of similarity between the section 3 and the section 6 (0.55), and the degree of similarity between the section 5 and the section 6 (0.25) are lower than 0.60 respectively. Therefore, the correction unit 15 does not correct their degrees of similarity to be higher.

FIG. 16 is an exemplary diagram representing corrected degrees of similarity of the each section corrected by the correction unit 15 in this example. As shown in FIG. 16, even if the estimation unit 14 incorrectly estimates that the direction of arrival of the utterance of the section 6 is the same as the one of the section 1, the section 3, and the section 5, the correction unit 15 does not correct the degree of similarity whose value is not higher than the prescribed threshold (0.60 in this example) to be higher.

Thus, the clustering unit 16 recognizes the speaker of the section 1, the section 3, and the section 5 as the same speaker (the speaker A). The clustering unit 16 recognizes the speaker of the section 2, the section 4, and the section 6 as the same speaker (the speaker B).

Hence, the speech processing apparatus 1 can perform the speaker clustering without declining accuracy, even if it incorrectly estimates the direction of arrival of the speech.

As mentioned above, the concrete example 3 is explained.

Concrete Example 4

Figure 17:
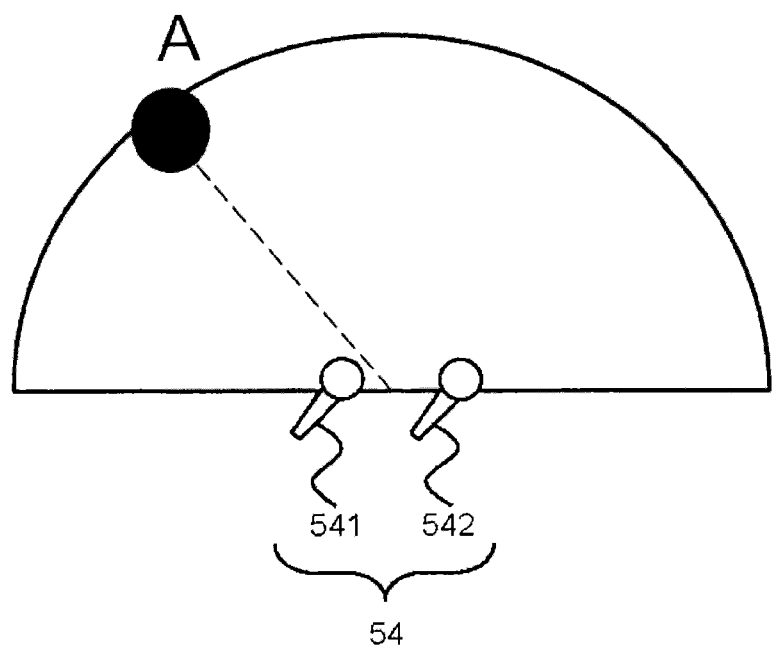
FIG. 17 is an exemplary diagram representing positions of a microphone array 54 and speakers according to a concrete example 4 in the first embodiment.

FIG. 17 is an exemplary diagram representing positions of a microphone array 54 and speakers according to a concrete example 4. In this example, it is assumed that the speaker A exists at a specific direction (−40 degrees in this example) from the microphone array 54.

Figure 18:
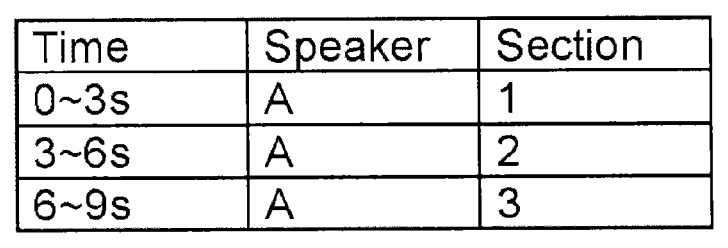

FIG. 18 is an exemplary diagram representing sections of speech data and speakers according to the concrete example 4. In this example, it is assumed that a section 1, a section 2, and a section 3 are sections uttered by the speaker A. The section 1 is the section from 0 second to 3 second in the speech data. The section 2 is the section from 3 second to 6 second in the speech data. The section 3 is the section from 6 second to 9 second in the speech data.

FIG. 19 is an exemplary diagram representing sections of the speech data separated by the separation unit 12 and degrees of similarity of acoustic features of each combination of the sections calculated by the calculation unit 13 in this example. The recognition threshold is also 0.80 in this example.

FIG. 20 is an exemplary diagram representing direction of arrivals of the speeches of the each section according to this example 4. As shown in FIG. 20, the direction of arrivals of the section 1 and the section 2 are mutually similar. However, in this example, it is assumed that the direction of arrival of the speech of the section 3 is incorrectly estimated to 0 degrees.

Figures 21A, 21B:
FIGS. 21(A) and 21(B) are exemplary diagrams representing corrected degrees of similarity of the acoustic features of the each section according to the concrete example 4.

FIGS. 21(A), 21(B) are exemplary diagrams representing corrected degrees of similarity of the acoustic features of the each section by the correction unit 15 in this example. FIG. 21(A) represents the degrees of similarity before correction with respect to the combination of the section 1 and the section 2. FIG. 21(A) represents the degrees of similarity before correction with respect to the combination of the section 1 and the section 2. FIG. 21(B) represents the degrees of similarity after correction with respect to the combination of the section 1 and the section 2.

Due to the correction by the correction unit 15, the degrees of similarity of each combination of the section 1 and the section 2 in the same group are corrected from the state in FIG. 21(A) to the state in FIG. 21(B).

FIG. 22 is an exemplary diagram representing corrected degrees of similarity of the acoustic features of the each section by the correction unit 15 in this example. As shown in FIG. 22, in this example, due to the correction by the correction unit 15, the degree of the similarity of the combination of the section 1 and the section 2 is corrected from 0.87 to 1.09. The degree of the similarity of the combination of the section 1 and the section 3 is not corrected. The degree of the similarity of the combination of the section 2 and the section 3 is not corrected.

However, the degree of the similarity of the combination of the section 1 and the section 3 is higher than 0.80. The degree of the similarity of the combination of the section 2 and the section 3 is also higher than 0.80. Therefore, the clustering unit 16 recognizes the speaker of the section 1, the section 2, and the section 3 as the same speaker (the speaker A). Hence, the same result as in FIG. 17 is obtained.

As mentioned above, the concrete example 4 is explained.

According to this embodiment, the speaker clustering can be performed without declining accuracy.

Meanwhile, the above-mentioned speech processing apparatus can be implemented using, for example, a general-purpose computer apparatus as the basic hardware. That is, the acquisition unit 11, the separation unit 12, the feature calculation unit 131, the similarity calculation unit 132, the estimation unit 14, the correction unit 15, the clustering unit 16, and the output unit 17 can be implemented by executing programs in a processor installed in the above-mentioned computer apparatus. At that time, the speech processing apparatus can be implemented by installing in advance programs executing the above-mentioned operations in the computer apparatus. Alternatively, the speech processing apparatus can be implemented by storing programs executing the above-mentioned operations in a memory medium such as a CD-ROM or by distributing programs executing the above-mentioned operations via a network, and then by appropriately installing the programs in the computer apparatus. Moreover, the acquisition unit 11, the separation unit 12, the feature calculation unit 131, the similarity calculation unit 132, the estimation unit 14, the correction unit 15, the clustering unit 16, and the output unit 17 can be implemented by appropriately making use of a memory or a hard disk that is either built-in in the above-mentioned computer apparatus or that is attached externally, or can be implemented by appropriately making use of a memory medium such as a CD-R, a CD-RW, a DVD-RAM, or a DVD-R.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A speech processing apparatus comprising:
   an acquisition processor configured to acquire a speech, wherein a microphone array including a plurality of microphones to acquire the speech and to provide the acquired speech to the acquisition processor;
   a separation processor configured to separate the speech into a plurality of sections in accordance with a prescribed rule;
   a calculation processor configured to calculate a degree of similarity in each combination of the sections;
   an estimation processor configured to estimate, with respect to the each section, a direction of arrival of the speech;
   a correction processor configured to group the sections whose directions of arrival are mutually similar into a same group and correct the degree of similarity with respect to the combination of the sections in the same group; and
   a clustering processor configured to cluster the sections by using the corrected degree of similarity.

2. The apparatus according to claim 1, wherein the calculation processor includes:
   a feature calculation processor configured to calculate acoustic features of each section, and
   a similarity calculation processor configured to calculate the degree of similarity in each combination of the sections by using the calculated acoustic features.

3. The apparatus according to claim 2,
   wherein the correction processor corrects the calculated degree of similarity with respect to the combination of the sections in the same group to a higher degree when the calculated degree of similarity is higher than a prescribed threshold.

4. The apparatus according to claim 3,
   wherein the correction processor corrects the calculated degree of similarity to a higher degree by multiplying the calculated degree of similarity by N(N is a real number whose value is more than 1), or by raising the calculated degree of similarity to an M-th power(M is a real number whose value is more than 1).

5. A speech processing method comprising:
acquiring a speech, wherein the acquiring the speech acquires the speech through a microphone array;
separating the speech into a plurality of sections in accordance with a prescribed rule;
calculating a degree of similarity in each combination of the sections;
estimating, with respect to the each section, a direction of arrival of the speech;
grouping the sections whose directions of arrival are mutually similar into a same group and correcting the degree of similarity with respect to the combination of the sections in the same group; and
clustering the sections by using the corrected degree of similarity.

6. A non-transitory computer readable medium including computer executable instructions, wherein the instructions, when executed by a processor, cause the processor to perform a method comprising:
acquiring a speech, wherein the acquiring the speech acquires the speech through a microphone array;
separating the speech into a plurality of sections in accordance with a prescribed rule;
calculating a degree of similarity in each combination of the sections;
estimating, with respect to the each section, a direction of arrival of the speech;
grouping the sections whose directions of arrival are mutually similar into a same group and correcting the degree of similarity with respect to the combination of the sections in the same group; and
clustering the sections by using the corrected degree of similarity.

* * * * *